(12) United States Patent
Fitzgerald et al.

(10) Patent No.: US 10,512,799 B2
(45) Date of Patent: Dec. 24, 2019

(54) RESTRAINT SYSTEM DUAL DISCONNECT

(71) Applicant: Capewell Aerial Systems LLC, South Windsor, CT (US)

(72) Inventors: Adam J. Fitzgerald, Enfield, CT (US); Stephen T. Parkinson, Suffield, CT (US)

(73) Assignee: Capewell Aerial Systems LLC, South Windsor, CT (US)

( * ) Notice: Subject to any disclaimer, the term of this patent is extended or adjusted under 35 U.S.C. 154(b) by 112 days.

(21) Appl. No.: 15/802,923

(22) Filed: Nov. 3, 2017

(65) Prior Publication Data

US 2018/0126196 A1 May 10, 2018

Related U.S. Application Data

(60) Provisional application No. 62/419,036, filed on Nov. 8, 2016.

(51) Int. Cl.
*A62B 35/00* (2006.01)
*B64D 17/32* (2006.01)
*B64D 17/38* (2006.01)

(52) U.S. Cl.
CPC .......... *A62B 35/0025* (2013.01); *B64D 17/32* (2013.01); *B64D 17/38* (2013.01)

(58) Field of Classification Search
CPC .................. A62B 35/0025; A62B 35/0037; B64D 17/32; B64D 17/38
See application file for complete search history.

(56) References Cited

U.S. PATENT DOCUMENTS

| | | | | | |
|---|---|---|---|---|---|
| 2,328,914 | A | * | 9/1943 | Kubat | B64D 17/38 294/82.25 |
| 2,430,985 | A | * | 11/1947 | King | B64D 17/32 24/573.11 |
| 2,902,737 | A | * | 9/1959 | Moran | A44B 11/2519 24/645 |
| 2,969,945 | A | * | 1/1961 | Richard | B64D 17/52 244/148 |
| 4,221,417 | A | * | 9/1980 | Towle | B64D 17/38 294/82.24 |
| 4,262,865 | A | * | 4/1981 | Smith | B64D 17/74 244/147 |
| 4,337,913 | A | * | 7/1982 | Booth | B64D 17/38 24/573.11 |

(Continued)

FOREIGN PATENT DOCUMENTS

EP 0699579 A1 * 3/1996 ............. B64D 17/38
GB 2154273 A * 9/1985 ............. B64D 17/38

*Primary Examiner* — Katherine W Mitchell
*Assistant Examiner* — Candace L Bradford
(74) *Attorney, Agent, or Firm* — Alix, Yale & Ristas, LLP

(57) ABSTRACT

A quick release restraint system comprising a restraint body that mates a harness fitting with a moveable lockpin. The lockpin is held in a closed position by a return member and can be moved to an open position when a sleeve and/or a ripcord is moved away from the lockpin. The sleeve surrounds the restraint body and mates with an internal lockpin body that may also be attached to the ripcord. The ripcord and/or sleeve engage the lockpin body in a single direction to generate a pulling force that counteracts a biasing force of the return member.

12 Claims, 6 Drawing Sheets

(56) References Cited

U.S. PATENT DOCUMENTS 4,365,776 A * 12/1982 Gaylord ............. A44B 11/2515
                                                      24/645
D437,901 S  *  2/2001 Forman ........................ D21/662
6,644,597 B1 * 11/2003 Bahniuk ................ B64D 17/30
                                                     244/142

* cited by examiner

RESTRAINT SYSTEM DUAL DISCONNECT

BACKGROUND

This disclosure is directed to an apparatus for releasably joining two lengths of material such as tethers or straps. More particularly, the disclosure is directed to an apparatus for connecting and releasing a user from an attachment point (such as a helicopter).

Disconnect devices exist to allow a releasable connection between a harness and strap, such as parachute disconnects, carabiners, and snap hooks. One example of a traditional parachute release is disclosed in U.S. Pat. No. 9,242,736. Current practice is to use a snap hook to attach a tether to an anchor line. While acceptable for normal use, this attachment is problematic in some scenarios because the snap hook is extremely difficult to release when under load. There are also designs which allow for remote disconnection via mechanical means.

There is a need in the art for a quick disconnect system that is easy to operate when under heavy load. A user must be able to comfortably reach and operate the system in inclement conditions and a remote release must also be available for emergencies. The system must also protect against inadvertent disconnection.

SUMMARY

The quick release restraint system includes a restraint body extending from an open end to a closed end. The restraint body defines a hollow interior and the closed end of the restraint body defines a lockpin aperture extending from the hollow interior through the closed end. A harness fitting is secured to the restraint body adjacent the open end.

The quick release system also includes lockpin body with a lockpin. The lockpin body is retained within the hollow interior of the restraint body. The lockpin extends from the hollow interior through the lockpin aperture. A return member is retained between the harness fitting and a first end of the lockpin body. The return member exerts a biasing force on the lockpin body towards the closed end. A sleeve surrounds the restraint body and supports a sleeve pin that protrudes into the hollow interior adjacent a second end of the lockpin body.

The sleeve pin exerts a pulling force on the lockpin body. The sleeve and lockpin body move away from the closed end from a fully closed position to a fully open position when the pulling force exceeds the biasing force.

The quick release restraint system may also include a ripcord terminating in a ripcord terminal. The ripcord extends into the open end and through a ripcord aperture in the lockpin body. The ripcord terminal also exerts a pulling force on the lockpin body when the ripcord moves away from the closed end. The ripcord and ripcord terminal may remain stationary within the restraint body when the sleeve is displaced.

The restraint body also includes a ring groove adjacent the closed end and the lockpin spans the ring groove. The lockpin aperture is at a first end of the ring groove and the lockpin extends through the lockpin aperture to engage the restraint body at a second end of the ring groove opposite the first end. The lockpin extends into a restraint aperture in the restraint body at the second end of the ring groove.

DETAILED DESCRIPTION

Figure 1:
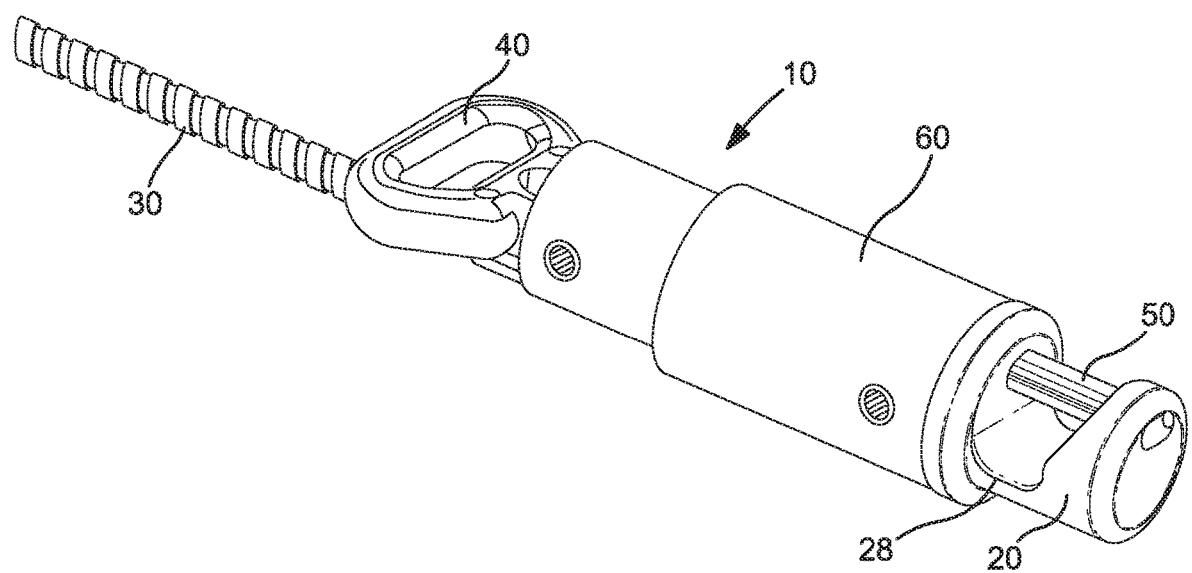
FIG. 1 is an isometric view of the disclosed restraint system dual disconnect.

With reference to the drawings wherein like numerals represent like parts throughout the figures, a restraint system dual disconnect (hereafter, the "RSDD") is generally designated by the numeral 10. With reference to FIG. 1, the RSDD 10 contains a restraint body 20 that extends from a ripcord housing 30 and a harness fitting 40 at one end to a lockpin 50 adjacent the opposite end. The ripcord housing 30 encloses a ripcord 32 (depicted in FIG. 3) and a moveable sleeve 60 surrounds the restraint body 20.

Figure 2:
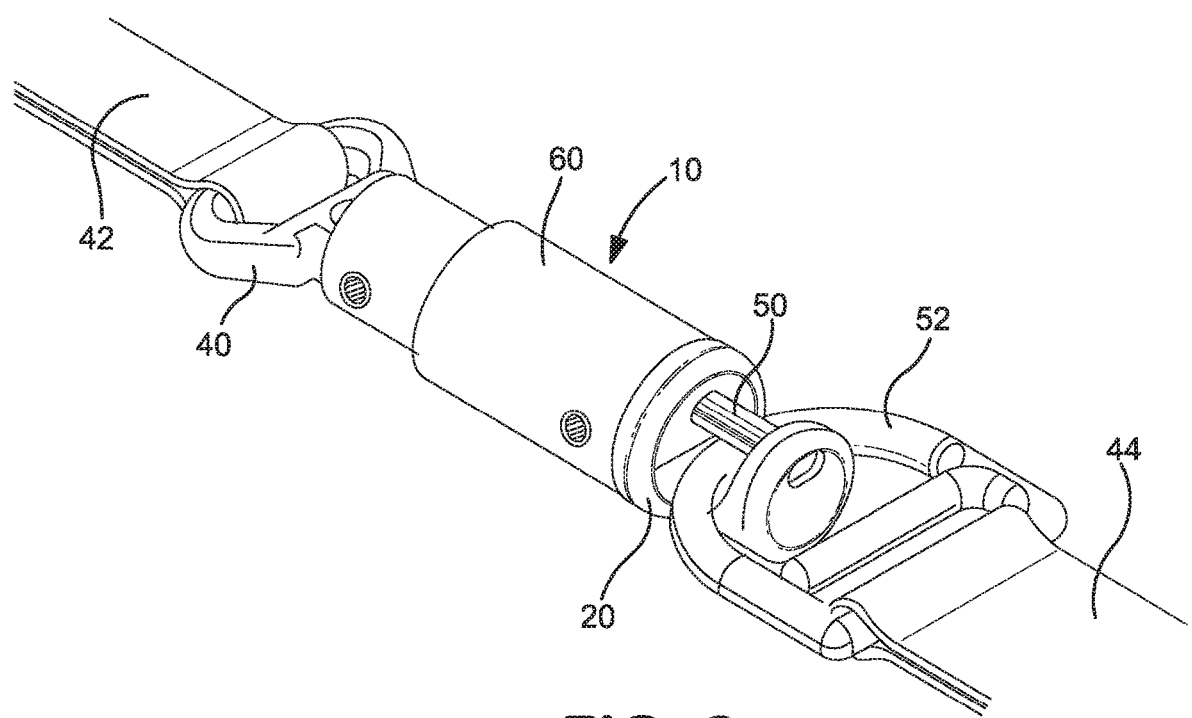
FIG. 2 is an isometric view of the restraint system dual disconnect of FIG. 1 including a harness tether and anchor strap.

Referring to FIG. 2, a harness tether 42 wraps around harness fitting 40 and an anchor strap 44 wraps around one end of D-shaped ring 52. Harness fitting 40 is releasably secured to D-shaped ring 52 by lockpin 50 and restraint body 20. In practice, the lockpin 50 can be displaced into the interior of restraint body 20, resulting in the release of the D-shaped ring 52 by either moving the sleeve 60 or the ripcord 32 (depicted in FIG. 3) away from the D-shaped ring 52.

Figure 3:
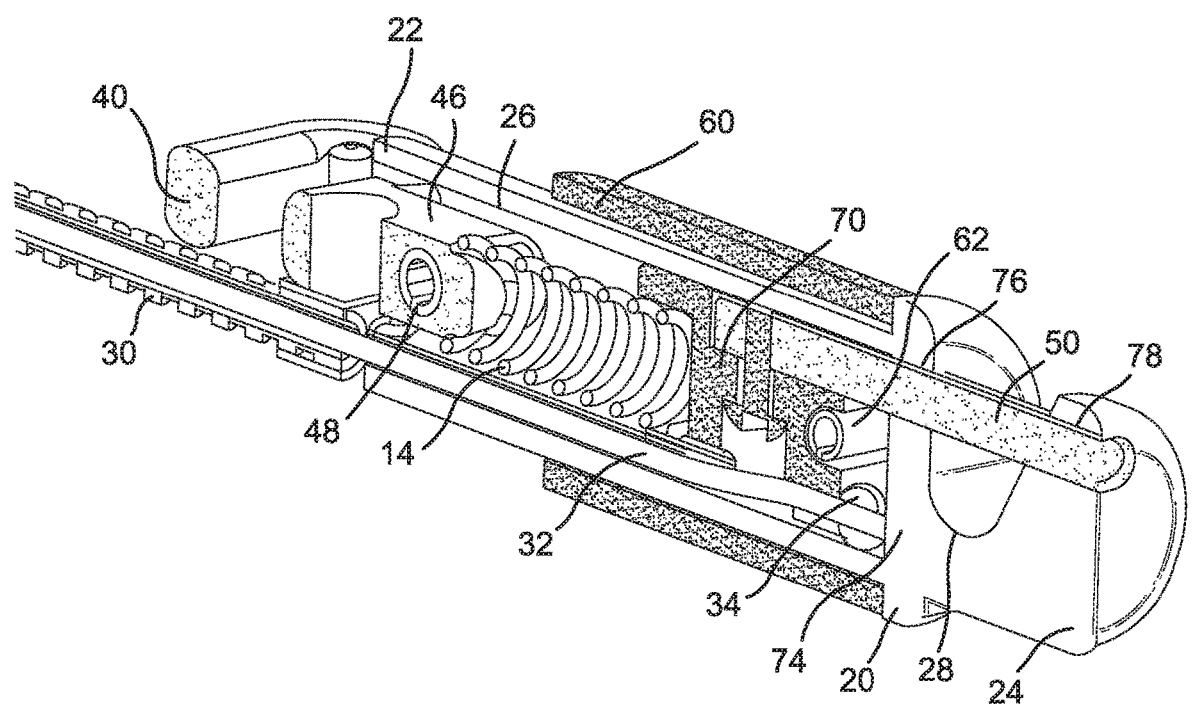
FIG. 3 is an isometric central sectional view of the restraint system dual disconnect of FIG. 1.

Referring to FIG. 3, the restraint body 20 extends from open end 22 to closed end 24. The restraint body 20 is mostly hollow and inner wall 26 extends from an open end 22 to a ripcord stop 74. Harness fitting 40 forms a hollow loop outside of the restraint body 20 and harness rod 46 extends into the open end 22 of restraint body 20. A harness pin 48 secures the harness rod 46 to the restraint body 20. A lockpin body 70 is located within the interior of restraint body 20, between a return member 14 and a sleeve pin 62. The lockpin body 70 is fixed to lockpin 50, which extends axially from the interior to the exterior of restraint body 20 through the lockpin aperture 76. The return member 14 exerts a biasing force on the lockpin body 70 towards closed end 24. The sleeve 60 releasably engages the lockpin body 70 at sleeve pin 62. The ripcord 32 releasably engages the lockpin body 70 at ripcord terminal 34. In the depicted embodiment, the lockpin 50 is in a fully closed state.

Figure 4:
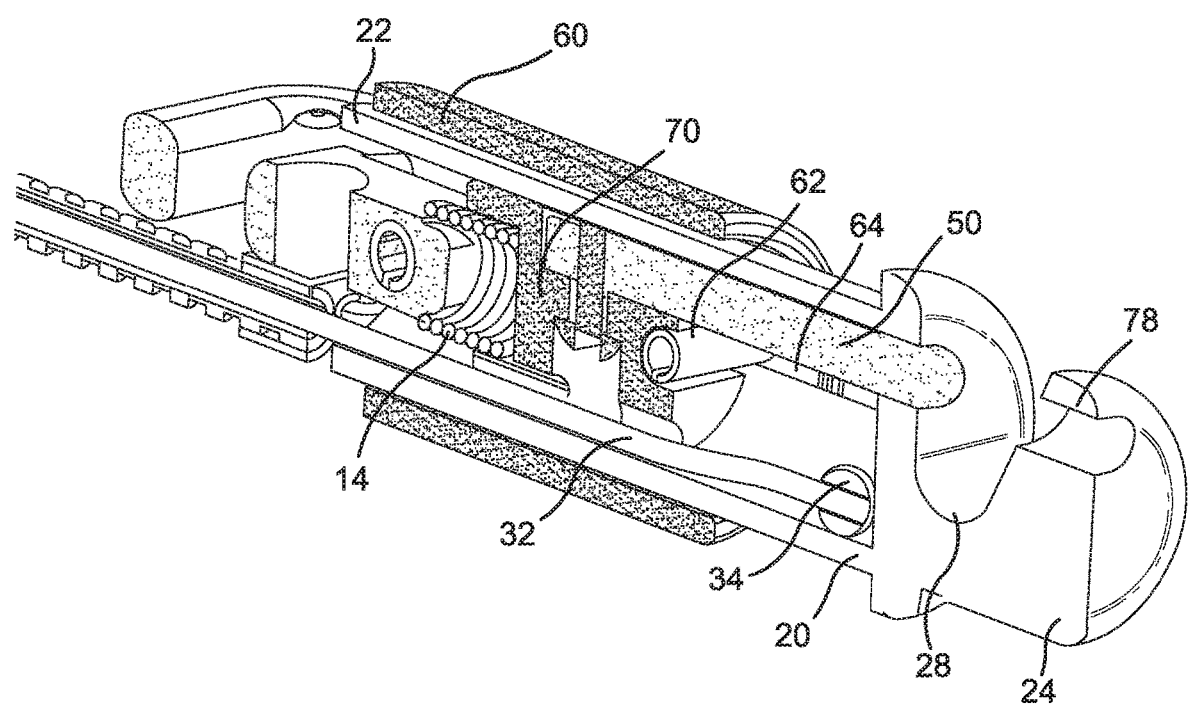
FIG. 4 is an isometric central sectional view of the restraint system dual disconnect of FIG. 1 in a fully open state in response to movement of the sleeve.

FIG. 4 depicts the axial displacement of lockpin 50 in response to movement of the sleeve 60 away from closed end 24. The sleeve pin 62 is mounted in the sleeve pin slot 64 in restraint body 20 to provide a stop surface for lockpin body 70. The force exerted on the sleeve 60 by the user towards the open end 22 transmits through the sleeve pin 62 to counteract the biasing force of return member 14. Once the biasing force is overcome, the sleeve 60 and lockpin body 70 move away from the closed end 24 and the lockpin 50 moves into the interior of restraint body 20 to the depicted fully open state. The displacement of lockpin 50 frees the D-shaped ring 52 and allows the anchor strap 44 to be disconnected from the harness tether 42 (not depicted). When the user releases the sleeve 60, the biasing force of return member 14 moves the lockpin body 70 towards the closed end 24 of restraint body 20 and returns the lockpin 50 to a fully closed state. During displacement of the sleeve 60, the ripcord 32 and ripcord terminal 34 may remain stationary within the restraint body 20.

Figure 5:
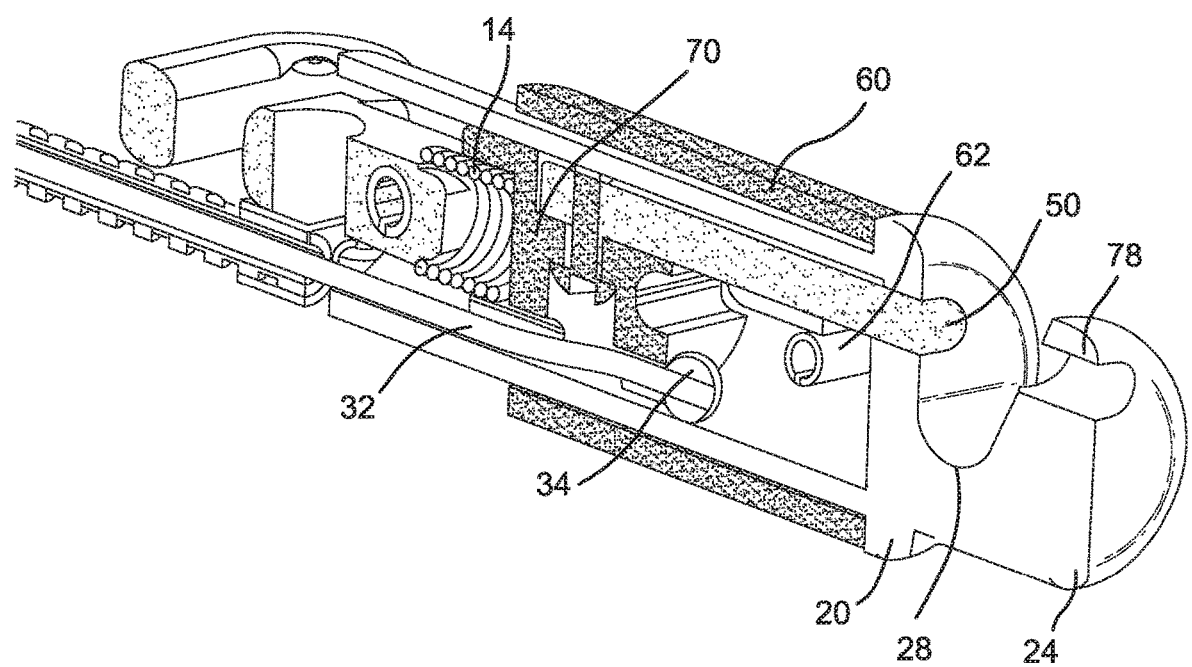
FIG. 5 is an isometric central sectional view of the restraint system dual disconnect of FIG. 1 in a fully open state in response to movement of the ripcord.

FIG. 5 depicts the axial displacement of lockpin 50 in response to movement of the ripcord 32 away from closed end 24. The ripcord 32 projects through lockpin body 70 and ripcord terminal 34 transmits an axial force on the ripcord 32 to lockpin body 70. When this force overcomes the biasing force of return member 14, the lockpin body 70 moves away from closed end 24, and the lockpin 50 moves into the interior of restraint body 20 to a fully open state. The displacement of lockpin 50 frees the D-shaped ring 52 and allows the anchor strap 44 to be disconnected from the harness tether 42 (not depicted). When the user releases the ripcord 32, the biasing force of return member 14 moves the lockpin body 70 towards the closed end 24 of restraint body 20 and returns the lockpin 50 to a fully closed state. During displacement of the ripcord 32 and ripcord terminal 34, the sleeve 60 and sleeve pin 62 may remain stationary relative to the restraint body 20.

Figure 6:
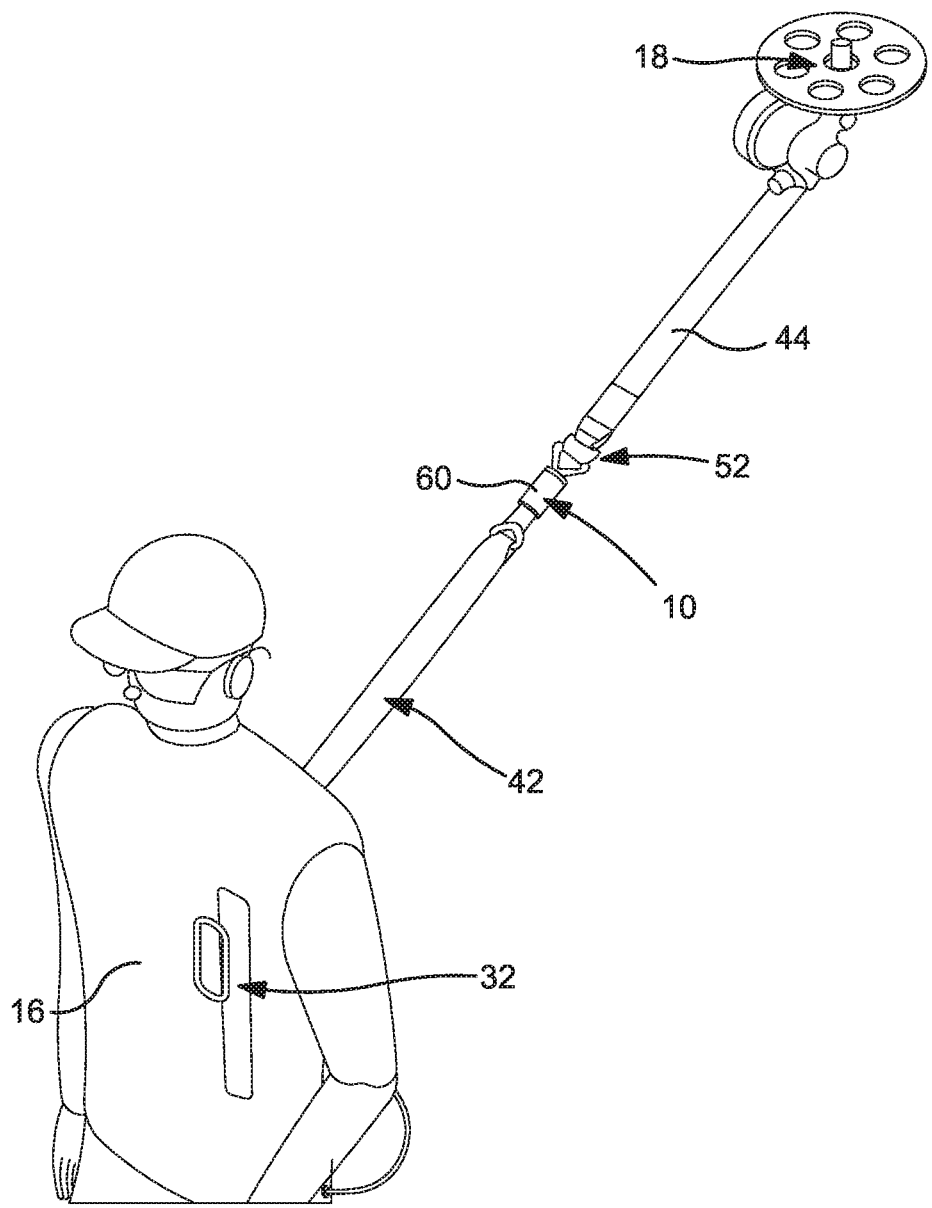
FIG. 6 is an isometric view of the restraint system dual disconnect of FIG. 2 attached to a user and a representative attachment point.

FIG. 6 depicts the RSDD 10 attached to a user 16 by a harness (not depicted). The RSDD 10 connects the harness tether 42 to an anchor strap 44 affixed to an attachment point 18. The user 16 can quickly and easily disconnect the harness tether 42 from the anchor strap 44 by either pulling ripcord 32 or moving sleeve 60.

The RSDD 10 is designed to be operated by hand actuation when the user 16 moves sleeve 60, but retains the ability to be operated in emergency situations by allowing the user 16 to pull ripcord 32. The use of a sleeve 60 performs better than traditional release mechanisms when the user 16 is wearing heavy gloves or in wet or greasy conditions. The use of ripcord 32 allows for quick and easy remote release for emergency situations. The structure of the RSDD 10 allows it to be released under heavy load and has a relatively long pull before releasing, which aids in prevention of inadvertent release. The streamlined shape of the RSDD 10 reduces the chance of snagging or entanglement on other lines, whilst providing clean, accessible, and obvious means of disconnection.

Referring to FIGS. 3-5, the lockpin 50 spans a ring groove 28 adjacent the closed end 24. The lockpin 50 protrudes from lockpin aperture 76 at a first end of the ring groove 28 and engages the restraint body 20 at a second end of the ring groove 28 opposite the first end. In the depicted embodiments, the lockpin 50 engages a restraint aperture 78 (depicted in detail in FIGS. 4 and 5) at the second end of the ring groove 28, and the restraint aperture 78 fully penetrates the closed end of the restraint body 20. In other embodiments, the restraint aperture 78 does not fully penetrate the closed end 24. Other engagement means between the lockpin 50 and the second end of the ring groove 28 do not substantially depart from the present disclosure.

In the depicted embodiments, the structure of the ring groove 28 allows for easy removal of the D-shaped ring 52 from the restraint body 20 when the lockpin 50 is in the fully open position. There is no lip or other longitudinal projection on either end of the ring groove 28 to impede removal of the D-shaped ring 52. This is particularly useful in applications in which there is a high load on the RSDD 10 resulting in large axial forces on harness tether 42 and anchor strap 44.

While a preferred embodiment has been set forth for purposes of illustration, the foregoing description should not be deemed a limitation of the device herein. Accordingly, various modifications, adaptations, and alternatives may occur to one skilled in the art without departing from the spirit of the invention and scope of the claimed coverage.

The invention claimed is:

1. A quick release restraint system comprising:
   a restraint body extending from an open end to a closed end, said restraint body defining a hollow interior, and a ring groove having a first end and a second end adjacent said closed end, said closed end defining a lockpin aperture extending from said hollow interior through said closed end;
   a harness fitting secured to said restraint body adjacent said open end;
   a lockpin body containing a lockpin, said lockpin body retained within said hollow interior and said lockpin extending from said hollow interior through said lockpin aperture and spanning said ring groove;
   a return member retained between said harness fitting and a first end of said lockpin body, said return member exerting a biasing force on said lockpin body towards said closed end; and
   a sleeve surrounding said restraint body containing a sleeve pin that protrudes into the hollow interior adjacent a second end of said lockpin body opposite said first end;
   wherein said lockpin extends through said lockpin aperture to engage said restraint body at the second end of said ring groove;
   wherein said sleeve pin exerts a pulling force when said sleeve moves away from said closed end, and said lockpin body moves away from the closed end from a fully closed position to a fully open position when said pulling force exceeds said biasing force.

2. The quick release restraint system of claim 1, further comprising a ripcord terminating in a ripcord terminal, said ripcord extending into said open end and through a ripcord aperture in said lockpin body;
   wherein said ripcord terminal exerts a pulling force when said ripcord moves away from said closed end.

3. The quick release restraint system of claim 2, wherein said ripcord and said ripcord terminal remain stationary within the restraint body when the sleeve is displaced.

4. The quick release restraint system of claim 2, wherein said ripcord terminal engages said lockpin body in one direction.

5. The quick release restraint system of claim 2, wherein said ripcord aperture has a diameter and said ripcord terminal has a diameter that is larger than the diameter of said ripcord aperture.

6. The quick release restraint system of claim 1, wherein said lockpin aperture fully penetrates said restraint body.

7. An attachment system comprising:
   a restraint body extending from an open end to a closed end, said restraint body defining a hollow interior, and said closed end defining a lockpin aperture extending from said hollow interior through said closed end, wherein said restraint body further has a ring groove adjacent said closed end;
   a harness fitting secured to said restraint body adjacent said open end;
   a lockpin body containing a lockpin, said lockpin body retained within said hollow interior and said lockpin extending from said hollow interior through said lockpin aperture and said lockpin spans said ring groove;
   a return member retained between said harness fitting and a first end of said lockpin body, said return member exerting a biasing force on said lockpin body towards said closed end; and a ripcord engaging said lockpin body;

wherein said lockpin aperture is at a first end of said ring groove and said lockpin extends through said lockpin aperture to engage said restraint body at the said end of said ring groove;

wherein said ripcord exerts a pulling force when said ripcord moves away from said closed end, and said lockpin body moves away from the closed end to an open position when said pulling force exceeds said biasing force.

8. The attachment system of claim 7, wherein said ripcord terminal engages said lockpin body in one direction.

9. The attachment system of claim 7, wherein said lockpin aperture fully penetrates said restraint body.

10. The attachment system of claim 7, further comprising a ripcord housing fixed to said restraint body and surrounding said ripcord.

11. The attachment system of claim 7, further comprising a sleeve surrounding said restraint body containing a sleeve pin that protrudes into the hollow interior adjacent a second end of said lockpin body opposite said first end;

wherein said sleeve pin exerts a pulling force when said sleeve moves away from said closed end.

12. The attachment system of claim 11, wherein said ripcord further comprises a ripcord terminal and said sleeve remains stationary when said ripcord and said ripcord terminal are displaced.

* * * * *